(12) United States Patent  
Fuchs et al.

(10) Patent No.: US 9,771,892 B2
(45) Date of Patent: Sep. 26, 2017

(54) METHOD OF STARTING UP A THERMOREACTOR

(71) Applicant: GE Jenbacher GmbH & Co OG, Jenbach (AT)

(72) Inventors: Jochen Fuchs, Wattens (AT); Friedhelm Hillen, Jenbach (AT)

(73) Assignee: GE Jenbacher GMBH & CO OG, Jenbach (AT)

( * ) Notice: Subject to any disclaimer, the term of this patent is extended or adjusted under 35 U.S.C. 154(b) by 0 days.

(21) Appl. No.: 14/715,970

(22) Filed: May 19, 2015

(65) Prior Publication Data

US 2015/0337758 A1 Nov. 26, 2015

(30) Foreign Application Priority Data

May 20, 2014 (AT) .................................. A 376/2014

(51) Int. Cl.
*F01K 13/00* (2006.01)
*F02G 5/02* (2006.01)
(Continued)

(52) U.S. Cl.
CPC ................ *F02G 5/02* (2013.01); *F01N 3/10* (2013.01); *F01N 3/18* (2013.01); *F01N 3/26* (2013.01);
(Continued)

(58) Field of Classification Search
CPC .... F01N 13/0093; F01N 13/0097; F01N 3/10; F01N 3/18; F01N 3/26; F01N 2240/10; F01N 2240/12; F01N 2240/16; F01N 2390/00; F01N 2430/08; F01N 2590/10; F02D 41/0245; F02G 5/02
See application file for complete search history.

(56) References Cited

U.S. PATENT DOCUMENTS 2,946,651 A * 7/1960 Houdry ................ B01D 53/944
126/91 A
3,172,251 A 3/1965 Johnson
(Continued)

FOREIGN PATENT DOCUMENTS

CN 1119128 A 3/1996
CN 2537823 Y 2/2003
(Continued)

OTHER PUBLICATIONS

European Search Report issued Oct. 15, 2015 in corresponding European Application No. 15167529 (with English translation).
(Continued)

*Primary Examiner* — Jason Shanske
*Assistant Examiner* — Matthew T Largi

(57) ABSTRACT

A method of starting up a thermoreactor arranged in an exhaust gas flow of an internal combustion engine includes igniting combustion gas by spark ignition in at least one cylinder of the internal combustion engine. The exhaust gas resulting from the combustion of the combustion gas is fed at least partially to the thermoreactor as an exhaust gas flow. The temperature of the exhaust gas resulting from combustion of the combustion gas is increased by the moment in time of the spark ignition being selected later in comparison with a present moment in time.

5 Claims, 2 Drawing Sheets

(51) Int. Cl.
  *F01N 3/10*      (2006.01)
  *F01N 3/18*      (2006.01)
  *F01N 3/26*      (2006.01)
  *F02D 41/02*     (2006.01)
  *F01N 13/00*     (2010.01)

(52) U.S. Cl.
  CPC ..... *F01N 13/0093* (2014.06); *F01N 13/0097* (2014.06); *F02D 41/0245* (2013.01); *F01N 2240/10* (2013.01); *F01N 2240/12* (2013.01); *F01N 2240/16* (2013.01); *F01N 2390/00* (2013.01); *F01N 2430/08* (2013.01); *F01N 2590/10* (2013.01); *Y02T 10/26* (2013.01)

(56) References Cited

U.S. PATENT DOCUMENTS

| | | | |
|---|---|---|---|
| 3,211,534 | A | 10/1965 | Ridgway |
| 3,276,202 | A | 10/1966 | Gary |
| 3,297,400 | A | 1/1967 | Eastwood |
| 3,799,134 | A | 3/1974 | Griese |
| 3,826,089 | A | 7/1974 | Nakajima et al. |
| 3,854,288 | A | 12/1974 | Heitland et al. |
| 3,927,523 | A * | 12/1975 | Shioyama ................ F01N 3/18 123/406.55 |
| 3,972,685 | A | 8/1976 | Hanaoka |
| 4,009,574 | A | 3/1977 | Melchior |
| 4,233,811 | A * | 11/1980 | Masaki .................... F01N 3/18 60/274 |
| 4,233,812 | A | 11/1980 | Leistritz |
| 4,848,082 | A * | 7/1989 | Takahashi ............. F01N 3/2006 440/89 G |
| 5,031,401 | A | 7/1991 | Hinderks |
| 5,195,316 | A | 3/1993 | Shinzawa et al. |
| 5,243,818 | A * | 9/1993 | Schatz .................... F01N 3/18 422/173 |
| 5,325,666 | A | 7/1994 | Rutschmann |
| 5,437,152 | A | 8/1995 | Pfefferle |
| 5,571,491 | A | 11/1996 | Thunstrom |
| 5,582,004 | A | 12/1996 | Rutschmann |
| 5,589,142 | A | 12/1996 | Gribbon |
| 5,593,645 | A | 1/1997 | Steenackers et al. |
| 6,261,093 | B1 * | 7/2001 | Matros ..................... F23G 5/50 432/180 |
| 6,370,872 | B1 | 4/2002 | Watanabe et al. |
| 6,530,215 | B2 | 3/2003 | Alkemade et al. |
| 6,955,042 | B1 | 10/2005 | Wnuck et al. |
| 7,334,400 | B2 | 2/2008 | Yan et al. |
| 7,386,977 | B2 | 6/2008 | Ancimer et al. |
| 7,571,602 | B2 | 8/2009 | Koch |
| 8,246,922 | B2 | 8/2012 | Boorse et al. |
| 8,268,273 | B2 | 9/2012 | Doering |
| 8,475,754 | B2 | 7/2013 | Eigenberger et al. |
| 8,534,051 | B2 | 9/2013 | Tsujimoto et al. |
| 8,627,654 | B2 | 1/2014 | Roos et al. |
| 8,631,647 | B2 | 1/2014 | Neels et al. |
| 8,689,547 | B2 | 4/2014 | Burgers et al. |
| 9,016,051 | B2 | 4/2015 | Iwasaki |
| 9,115,625 | B2 | 8/2015 | Igarashi |
| 2005/0000215 | A1 | 1/2005 | Baeuerle |
| 2006/0053771 | A1 | 3/2006 | Murata |
| 2006/0123784 | A1 | 6/2006 | Algrain |
| 2009/0130011 | A1 | 5/2009 | Abrams et al. |
| 2010/0154411 | A1 | 6/2010 | Brueck et al. |
| 2011/0022289 | A1 | 1/2011 | Hofbauer |
| 2012/0117962 | A1 | 5/2012 | Vandyne et al. |
| 2012/0216529 | A1 | 8/2012 | Joshi et al. |
| 2014/0007851 | A1 | 1/2014 | Vassallo et al. |
| 2015/0176454 | A1 | 6/2015 | Dreves et al. |

FOREIGN PATENT DOCUMENTS

| | | |
|---|---|---|
| CN | 102562233 A | 7/2012 |
| CN | 103527331 A | 1/2014 |
| DE | 3045666 A1 | 7/1982 |
| DE | 69220092 T2 | 12/1997 |
| DE | 10139526 A1 | 2/2003 |
| DE | 10327686 A1 | 1/2005 |
| DE | 102006037649 A1 | 2/2008 |
| DE | 102010011026 A1 | 9/2011 |
| DE | 102011086778 A1 | 5/2013 |
| EP | 161470 A1 | 11/1985 |
| EP | 668471 A2 | 8/1995 |
| EP | 2006178 A1 | 12/2008 |
| EP | 2535539 A1 | 12/2012 |
| EP | 2578866 A1 | 4/2013 |
| EP | 2671630 A1 | 12/2013 |
| JP | H0267021 A | 3/1990 |
| JP | H0754640 A | 2/1995 |
| JP | H07224641 A | 8/1995 |
| JP | H0913958 A | 1/1997 |
| JP | 2004197569 A | 7/2004 |
| JP | 2004211660 A | 7/2004 |
| JP | 2005061366 A | 3/2005 |
| JP | 2008038736 A | 2/2008 |
| JP | 2010242522 A | 10/2010 |
| JP | 2012246920 A | 12/2012 |
| JP | 2013155727 A | 8/2013 |
| JP | 2014066219 A | 4/2014 |
| WO | 91/13242 | 9/1991 |
| WO | 9947245 A1 | 9/1999 |
| WO | 2004113694 A1 | 12/2004 |
| WO | 2005093235 A1 | 10/2005 |
| WO | 2011023848 A1 | 3/2011 |
| WO | 2012123636 A1 | 9/2012 |

OTHER PUBLICATIONS

2015 Clarke Energy website explanation of CL.AIR® System, mentioned in the specification.
Unofficial English translation of Austrian Office Action issued in connection with related AT Application No. A377/2014 dated May 13, 2015.
Unofficial English Translation of Austrian Office Action issued in connection with related AT Application No. A572/2014 dated Jul. 10, 2015.
European Search Report and Written Opinion issued in connection with related EP Application No. 15167318.3 dated Oct. 9, 2015.
European Search Report and Written Opinion issued in connection with related EP Application No. 15001908 dated Dec. 3, 2015.
CA Office Action issued in connection with related Ca Application No. 2892397 dated Mar. 17, 2016.
U.S. Non-Final Office Action issued in connection with related U.S. Appl. No. 14/714,623 dated Apr. 8, 2016.
U.S. Non-Final Office Action issued in connection with related U.S. Appl. No. 14/788,986 dated Jul. 5, 2016.
Unofficial English translation of Austrian Office Action issued in connection with related AT Application No. A50758/2015 dated Jul. 8, 2016.
Unofficial English translation of Austrian Office Action issued in connection with related AT Application No. A50756/2015 dated Jul. 18, 2016.
Unofficial English translation of Japanese search report issued in connection with related JP Application No. 2015130611 dated Jul. 20, 2016.
Unofficial English translation of Austrian Office Action issued in connection with related AT Application No. A50759/2015 dated Jul. 27, 2016.
Unofficial English translation of Korean Office Action issued in connection with related KR Application No. 102015-0102685 on Aug. 19, 2016.
European Office Action issued in connection with related EP Application No. 15167318.3 dated Sep. 9, 2016.
U.S. Final Office Action issued in connection with related U.S. Appl. No. 14/714,623 dated Oct. 21, 2016.
International Search Report and Written Opinion issued in connection with related PCT Application No. PCT/EP20161070635 dated Nov. 25, 2016.

(56) References Cited

OTHER PUBLICATIONS

International Search Report and Written Opinion issued in connection with related PCT Application No. PCT/EP20161070841 dated Dec. 13, 2016.
GB Search Report and issued in connection with related GB Application No. 1615026.0 dated Jan. 25, 2017.
U.S. Final Office Action issued in connection with related U.S. Appl. No. 14/788,986 dated Feb. 16, 2017.
Unofficial English Translation of Chinese Office Action issued in connection with related CN Application No. 201510478367.9 dated Feb. 20, 2017.
Unofficial English Translation of Chinese Office Action issued in connection with related CN Application No. 201510430081.3 dated Apr. 20, 2017.

* cited by examiner

METHOD OF STARTING UP A THERMOREACTOR

BACKGROUND OF THE INVENTION

Field of the Invention

The invention concerns a method of starting up a thermoreactor arranged in an exhaust gas flow from an internal combustion engine, wherein combustion gas is ignited by spark ignition in at least one cylinder of the internal combustion engine and the exhaust gas resulting from combustion of the combustion gas is at least partially fed as an exhaust gas flow to the thermoreactor.

Description of Related Art

Methods of exhaust gas post-treatment are frequently used to comply with the emission limit values of internal combustion engines. A method which is also known from the field of exhaust gas post-treatment of caloric power plants is regenerative thermal oxidation (RTO) in which unburnt hydrocarbons and other oxidisable exhaust gas constituents are thermally oxidised. In regenerative thermal oxidation, the exhaust gas is firstly passed by way of a heat storage means generally comprising ceramic loose material or honeycomb bodies in order finally to pass into the reaction chamber. In the reaction chamber, the exhaust gas is further heated by additional heating devices until thermal oxidation of the unwanted exhaust gas constituents can take place. The exhaust gas then flows through a further heat storage means to the exhaust pipe and is discharged into the environment. In operation, the flow direction is alternately altered whereby the exhaust gas is pre-heated before reaching the reaction chamber, thereby achieving an energy saving in further heating of the exhaust gas. The additional heating effect can be implemented by gas injection or burners (so-called support gas) or an electrical additional heating device. The reaction chamber generally has a free flow cross-section whereby the residence time of the exhaust gas in the reaction chamber is increased and oxidation can take place in the form of a gaseous phase reaction. Carbon monoxide (CO) and methane ($CH_4$) are particularly relevant among the species to be oxidised in the exhaust gas.

Such an arrangement is known, for example, by the trade name CL.AIR® from GE Jenbacher. In that method, exhaust gas is heated to about 700-800° C. and oxidation of the unburnt hydrocarbons and the carbon monoxide is effected to give water vapor and carbon dioxide. The CL.AIR® thermoreactor is in the form of a regenerative heat exchanger and comprises two storage masses, a reaction chamber and a switching-over mechanism. The exhaust gas flows coming from the engine at a temperature of about 530° C. by way of a switching-over mechanism into a first storage mass where it is heated to approximately 800° C. In the reaction chamber, the exhaust gas reacts with the oxygen present, in which case carbon monoxide and unburnt hydrocarbons are oxidised to give carbon dioxide and water. When flowing through the second storage mass, the exhaust gas again gives off heat and is at a temperature of between 550 and 570° C. when reaching the switching-over mechanism which passes it to the chimney or a downstream-disposed exhaust gas heat utilisation arrangement.

A disadvantage with solutions known from the state of the art is that, during the engine start-up phase, when therefore the thermoreactor has not yet reached its operating temperature, oxidisable species are emitted to an undesirably high extent.

SUMMARY OF THE INVENTION

The object of the present invention is to provide a method by which the start-up (the starting phase) of a thermoreactor disposed in an exhaust gas flow of an internal combustion engine is improved.

According to one aspect of the present invention, the temperature of the exhaust gas resulting from combustion of the combustion gas is increased by the moment in time of the spark ignition being selected later in comparison with a present moment in time. Retarding the ignition time in the start-up phase provides that exhaust gas at a higher temperature level is fed to the thermoreactor so that the storage masses and the reaction chamber of the thermoreactor receive more energy, and as a result, the thermoreactor can be more rapidly raised to operating temperature.

According to another aspect of the present invention, a power output of the internal combustion engine is reduced to reduce the mass flow of the exhaust gas flow. By reducing the power output of the internal combustion engine, the exhaust gas mass flow flowing through the thermoreactor is reduced. As a result, a residence time for the exhaust gas in the thermoreactor is increased. The discharge of thermal energy from the thermoreactor is reduced in that way. The measure of reducing the power output of the internal combustion engine can be implemented alternatively or additionally to the above-described retardation of the ignition timing point. Both measures provide that the thermoreactor more rapidly reaches the temperature necessary for thermal oxidation of the exhaust gas.

In another aspect of the present invention, the exhaust gas is heated by an external heat source, for example, electrical heating bars, and as a result, there is provided an additional heating means by which the thermal reactor more rapidly reaches the temperature necessary for oxidation of the unburnt hydrocarbons and carbon monoxide in the exhaust gas. It is also possible for the exhaust gas to be heated by the combustion of combustible gas.

According to another aspect of the present invention, the switching time of the switching-over mechanism is reduced for more rapidly heating up the thermoreactor. As described earlier, a thermoreactor has a switching-over mechanism, by way of which the direction of flow through the at least two storage masses and the reaction chamber can be alternately changed. It is therefore provided that the switching time is reduced in relation to the switching time in normal operation for reversing the direction of flow through the thermoreactor, thereby allowing the temperatures in the portions of the storage masses, that are closer the reaction chamber, to increase more quickly. Typical switching times in normal operation of a thermoreactor are about 3 minutes, that is to say the direction of flow through the thermoreactor is reversed every 3 minutes. In accordance with the present invention, the switching times are reduced in relation to normal operation, for example, the switching times may be reduced to 1 or 2 minutes. This prevents temperature equalisation within the storage masses, whereby a temperature gradient is constituted to such an extent that the temperature in the volume portion of the storage masses, that is associated with the reaction chamber, is markedly higher than the temperature of the volume portion of the storage masses, that is closer to the switching-over mechanism. By virtue of the temperature of the storage masses, that is increased near the reaction chamber, the temperature of the exhaust gas to be oxidised is increased in the region of the reaction chamber, in relation to the conventional switching times. Accordingly, the thermoreactor reaches the required conversion rates more quickly when starting up.

The particular advantage of the described measures is that much less energy, whether being electrical energy or by virtue of additional heating by way of burners or gas injection, has to be invested into the operation of heating up the thermoreactor. When the stable condition of the thermoreactor is reached, that is, the start-up phase is concluded, the switching time can be prolonged. The measures are implemented until it is seen from a measurement that the thermoreactor start-up operation is concluded. The start-up operation can typically be deemed to be terminated when the reaction chamber has reached a temperature of 700-800° C.

BRIEF DESCRIPTION OF THE DRAWINGS

The invention is described in greater detail hereinafter by means of the Figures in which.

DETAILED DESCRIPTION OF THE INVENTION

Figure 1:
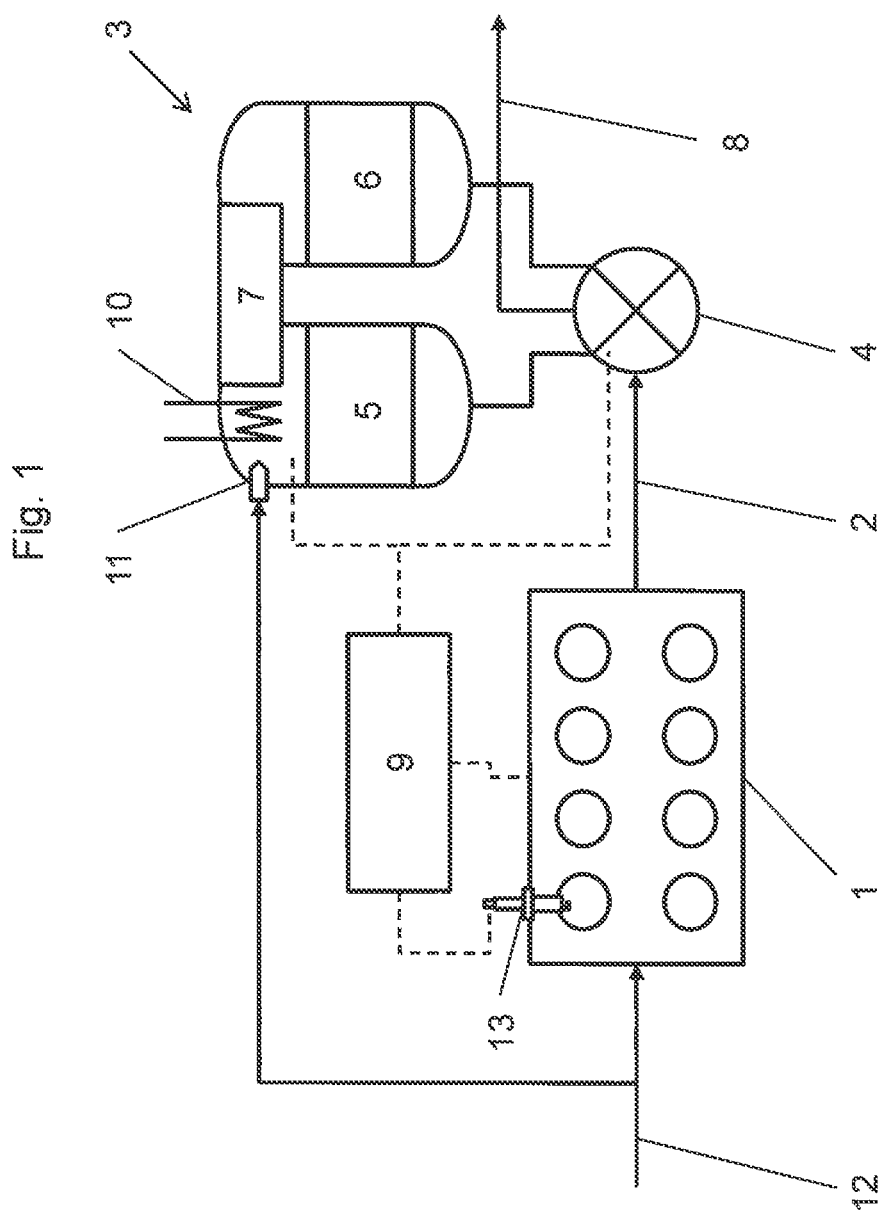
FIG. 1 shows a diagrammatic view of an internal combustion engine with downstream-connected thermoreactor.

FIG. 1 shows an internal combustion engine 1, from which untreated exhaust gas flows through the exhaust manifold 2 in the direction of a switching-over mechanism 4. From the switching-over mechanism 4 the exhaust gas flows further into the thermoreactor, in which case the switching-over mechanism 4 can alternately change the flow direction through the thermoreactor 3. The flow direction can either be firstly by way of the storage mass 5, the reaction chamber 7 and then the storage mass 6, or vice-versa. The exhaust gases then leave the plant by way of the conduit 8.

The thermoreactor is heatable by the electrical additional heating means 10. Support gas can also be fed to the thermoreactor as additional heating, by way of a burner or injector 11. The gas for the burner or injector 11 can be taken from the fuel line 12.

The open loop/closed loop control device 9, by way of the signal lines shown in broken line, receives signals from temperature sensors (not shown) from the region of the switching-over mechanism 4 and the reaction chamber 7. In addition from the internal combustion engine 1 the open loop/closed loop control device 9 receives signals which are characteristic of the operating state of the internal combustion engine 1. In dependence on the detected signals, the open loop/closed loop control device 9 gives commands to the switching-over mechanism 4 for reversing the flow direction through the thermoreactor 3.

The open loop/closed loop control device 9 provides the internal combustion engine 1 with target values for the power output to be delivered and/or engine speed. An ignition device 13 is diagrammatically shown. It will be appreciated that, in reality, at least one ignition device 13 is associated with each piston-cylinder unit. The open loop/closed loop control device 9 gives the ignition device 13 commands, inter alia relating to the moment in time of spark ignition.

The thermoreactor 3 can also assume other structural forms. Thus, for example, it can be provided that the switching-over mechanism 4 is in the form of a rotary slider, that is to say in the form of a plate with alternately closed and opened segments which alternately close or open the flow through the thermoreactor 3 which is arranged downstream of the rotary slider. It is, therefore, in no way necessary to have a separate housing for the storage masses 5 and 6, as diagrammatically shown in FIG. 1, but it is possible for the thermoreactor 3 also to be in the form of a one-piece column of storage masses, wherein the rotary slider in operation makes certain segments available for the flow therethrough and keeps other segments closed.

Figure 2:
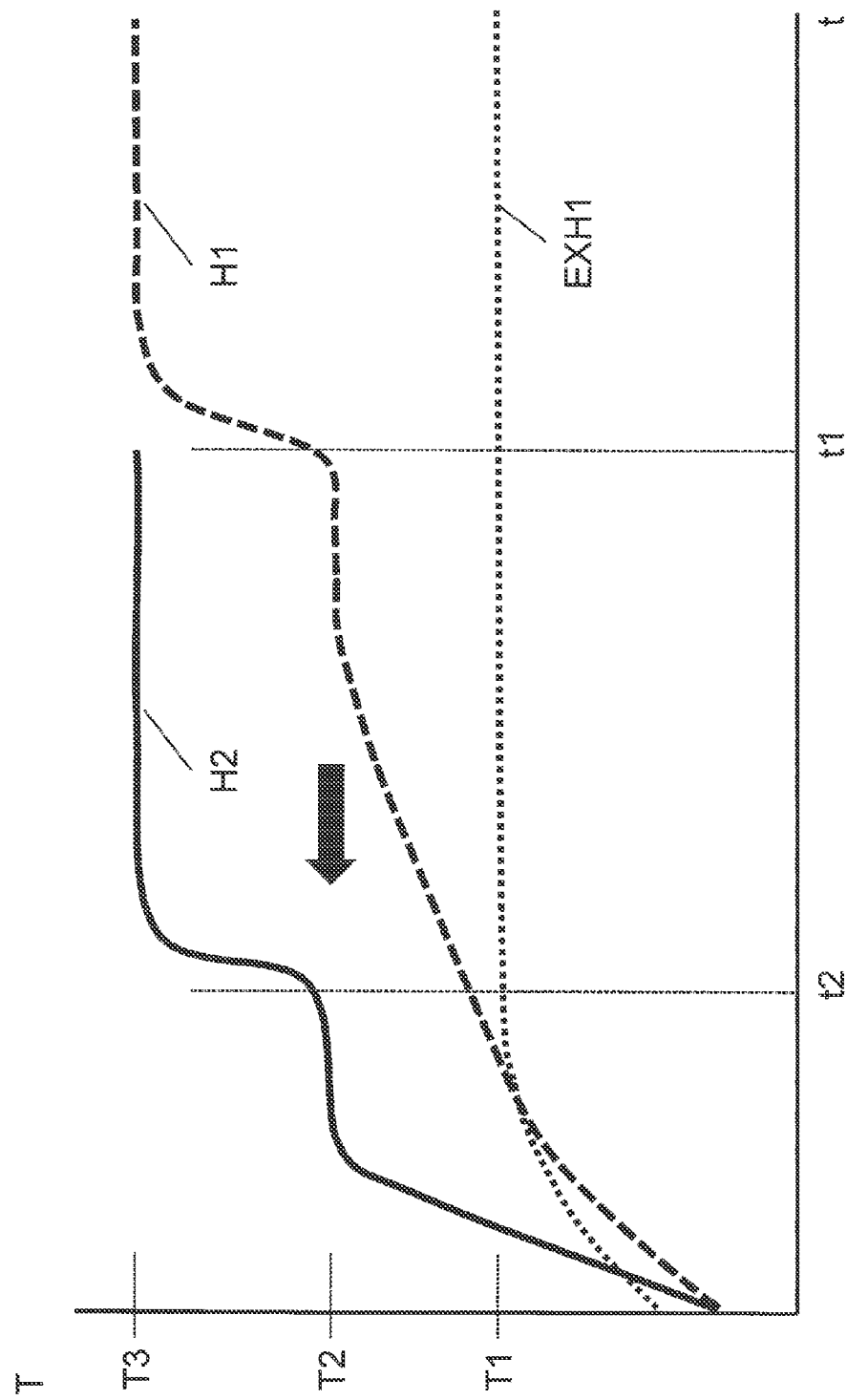
FIG. 2 shows (diagrammatically) the temperature pattern when starting up a thermoreactor.

FIG. 2 diagrammatically shows the temperature pattern when starting up a thermoreactor in accordance with the state of the art in comparison with the temperature pattern in accordance with the improved method of the present application. In the graph, the temperature is plotted on the y-axis in relation to time on the x-axis, wherein the time begins at zero at the origin of the co-ordinate system. The temperature in the reaction zone of the thermoreactor initially rises due to the transmission of heat from the exhaust gas to the reaction chamber and due to the electrical additional heating means which are active from the start onwards.

To assess the start-up performance, that time is critical, which elapses until a first temperature plateau is reached at the temperature T2. The temperature T2 is selected approximately as being 630° C. It is only when that temperature is reached that the additional heating is begun using a burner or gas injection. Below that temperature no gas should be fed to the thermoreactor as conversion would not be guaranteed. Therefore, the duration until the temperature T2 is reached is the determining factor in respect of time for the start-up procedure.

After initiation of the additional heating by a burner or gas injection the thermoreactor quickly reaches the operating temperature T3 of about 800° C.

The broken line H1 shows the temperature pattern in the reaction zone when starting up a thermoreactor in accordance with the state of the art. The temperature pattern of the exhaust gas in accordance with a method according to the state of the art is represented by the dotted curve EXH1. Here, the exhaust gas temperature in the stable mode is at about 530° C. (T1). Time t1 marks the moment in time of initiating additional heating in the reaction zone with a method according to the state of the art.

In comparison therewith the temperature of the reaction zone in accordance with the improved method of the present application, represented by curve H2, reaches the temperature T2 at which the additional heating may be activated, substantially earlier, namely at time t2. The displacement to earlier times is symbolised by the black arrow.

Typical times for t1 are 10 hours when the installation is started up from ambient temperature, or 10 minutes when the installation is set in operation again after only a short stoppage time (for example after an inspection of two hours).

Those times can be markedly reduced by using the methods described in the variants or embodiments by way of example.

LIST OF REFERENCES USED 1 internal combustion engine
2 exhaust manifold
3 thermoreactor
4 switching-over mechanism
5, 6 thermal storage masses
7 reaction chamber
8 exhaust gas conduit
9 open loop/closed loop control device 10 electrical heating device
11 burner/injector
12 fuel line
H1 temperature pattern of thermoreactor in the state of the art
H2 temperature pattern of the thermoreactor
EXH1 exhaust gas temperature in the state of the art

The invention claimed is:

1. A method of starting up a thermoreactor arranged in an exhaust gas flow of an internal combustion engine, the thermoreactor including a first thermal storage mass and a second thermal storage mass which successively have a flow therethrough, the method comprising:
    igniting combustion gas by spark ignition in one cylinder of the internal combustion engine; and
    feeding exhaust gas resulting from the igniting of the combustion gas to the thermoreactor as the exhaust gas flow,
    wherein the feeding the exhaust gas includes alternatively feeding, according to a switching time, the exhaust gas to (i) the first thermal storage mass such that the exhaust gas fed to the first thermal storage mass then successively flows through the second thermal storage mass and (ii) the second thermal storage mass such that the exhaust gas fed to the second thermal storage mass then successively flows through the first thermal storage mass, and
    wherein the thermoreactor is heated by an external heat source, and the switching time during a start-up operation of the thermoreactor is reduced with respect to a normal operation of the thermoreactor for more rapidly heating up the thermoreactor during the start-up operation of the thermoreactor.

2. The method according to claim 1, wherein a temperature of the exhaust gas resulting from combustion of the combustion gas is increased by delaying a timing of the spark ignition with respect to a standard operation timing.

3. The method according to claim 1, further comprising reducing a power output of the internal combustion engine to reduce a mass flow of the exhaust gas flow.

4. The method according to claim 1, further comprising heating the exhaust gas fed to the thermoreactor using the external heat source,
    wherein the external heat source is an electrical heating device.

5. The method according to claim 1, wherein the switching time is set such that the exhaust gas is alternatively fed to the first thermal storage mass and the second thermal storage mass to prevent thermal equalization within the first thermal storage mass and the second thermal storage mass.

* * * * *